Aug. 6, 1929.   C. BUSSARD   1,723,539
SORTING MACHINE
Filed Nov. 23, 1926
Fig.1.
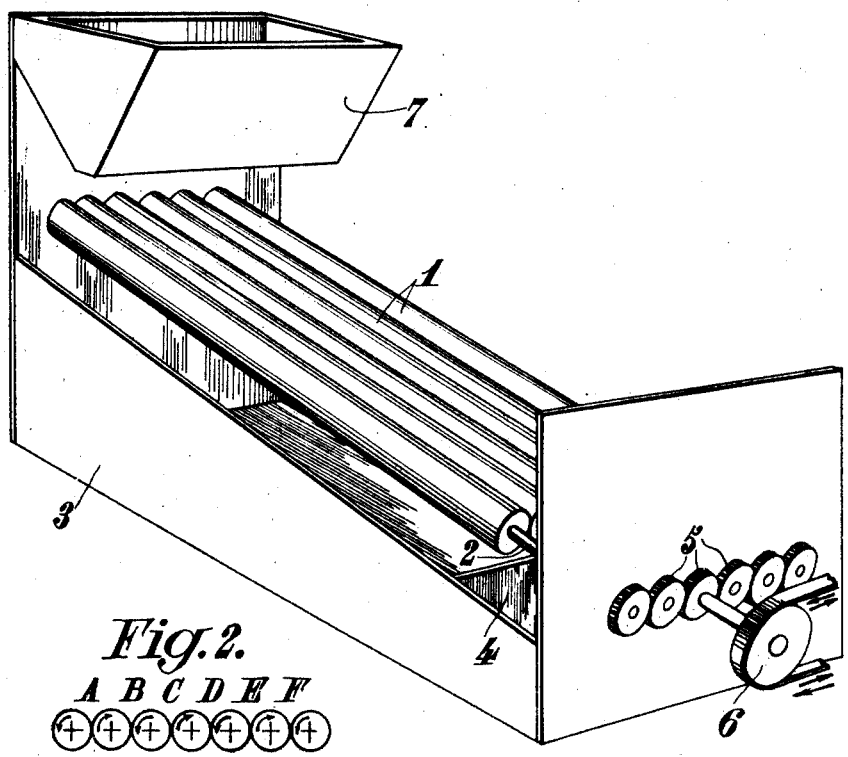
Fig.2.
A B C D E F
Fig.3.
A B C D E F
Fig.4.
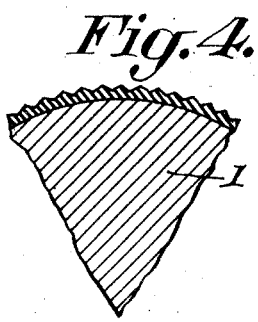
C. Bussard
Inventor
By Marks & Clerk
Attys Patented Aug. 6, 1929.

1,723,539

UNITED STATES PATENT OFFICE.

CLAUDE BUSSARD, OF PARIS, FRANCE, ASSIGNOR TO THE FIRM: SOCIÉTÉ D'APPLICATIONS ET DE RECHERCHES SCIENTIFIQUES ET INDUSTRIELLES, OF ISSY, SEINE.

SORTING MACHINE.

Application filed November 23, 1926, Serial No. 150,327, and in France November 28, 1925.

Certain granular bodies and especially certain seeds have uniform shape and size and, consequently, are very difficult to sort or separate by means of any of the methods or apparatus hitherto in use, even by screening.

This is particularly the case with certain seeds of leguminous plants which are difficult to separate from seeds of parasitic plants and weeds and this is especially the case with clover and lucern seeds which have the same average size and shape and the same specific gravity as dodder seeds which it is of great importance to separate them from.

Dodder seeds have some rugosity and the machine which is the object of my invention is based on the utilization of this peculiarity in order to obtain separation or sorting.

I wish it to be clearly understood however, that the serviceability of my machine is by no means limited to separation of dodder from clover or from lucern seeds and that this particular use is instanced merely as an example, my machine being adapted to sort granular bodies having uniform size and shape, except that some of the bodies have a rugose exterior and the remaining bodies have a smooth exterior; the machine operates to separate the bodies having a rough exterior from those having a smooth exterior.

In order to make my invention more clearly understood I have illustrated, as an example, an embodiment of a machine constructed in accordance therewith in and by a drawing appended hereto and wherein:

Figure 1 is a perspective view of the separating or sorting device.

Figures 2 and 3 are diagrammatically explanatory.

Fig. 4 is an enlarged fragmentary sectional detail of one of the rollers.

My machine is composed essentially of a floor constituted by parallel rollers 1 tangent to one another, and each of which revolves in a direction opposite to the next one, said rollers being inclined respective the horizontal plane.

They may be made entirely of india-rubber or consist of a tube or rod covered with a sheath made of rubber or of any other material sufficiently resilient to permit, without any permanent set of the rollers, a somewhat sizable granular body to pass through between any two of them; said material must however, have some rugosity and the rollers are coated with a sheathing having a grain corresponding to the grain of the rugous or rough surfaced bodies to be separated.

The size of those rollers is governed by the diameter of the bodies to be sorted.

Said rollers will preferably have one of their ends 2 smaller in diameter than the bulk thereof. I arrange them above a container having two compartments 3 and 4 and they carry on one of their ends one or two toothed pinions 5 meshing with the next ones. These pinions are rotated now in the one and then in the opposite direction through, say, a pulley 6 secured on the spindle of one of the rollers. Motion may be imparted by any suitable mechanical or other means.

The machine is completed by a distributing hopper 7 for feeding the material onto the upper ends of the rollers.

Operation is as follows:

The seeds or bodies to be sorted (smooth seeds and rough seeds) contained in the hopper 7 spread on the rollers 1 which are rotated first in one direction, as diagrammatically shown by Figure 2, and next in the opposite direction, as shown by Figure 3, and so on. During the first movement the rough bodies located in the gutters B D F formed by rollers 1 are taken along by the rollers which themselves are rough, being thus made to pass between the rollers and fall into compartment 3. When the rollers are rotated in the opposite direction it is the rough bodies located in gutters A C E that are taken along by rollers 1 and drop into 3.

Due to the slope of the floor and to the motion of the rollers the whole area of the floor formed by rollers 1 is spread with the bodies to be sorted, the rough bodies being retained by the rollers while the smooth bodies work their way down all along the rollers without being stopped and, on reaching the end, drop into container 4.

I wish it to be clearly understood that the indicated forms and materials are given only as examples and that I reserve the right to introduce any constructional and/or other modifications without departing from the scope of my invention.

Having now particularly ascertained and described the nature of my said invention as well as the manner in which the same is to be performed, I declare that what I claim is:

1. In apparatus for sorting granular bodies having smooth surfaces from granular bodies having rugose surfaces, the combination with a support, of a floor carried by the support, comprising a series of axially inclined rollers tangentially arranged as to the adjacent rollers, each of said rollers having a resilient sheath with its periphery grained to correspond with the rugosities of the granular bodies to be separated from the smooth surfaced granular bodies, means for feeding the granular bodies onto the floor, and means for rotating the rollers to engage the rugose granular bodies to separate the latter from the smooth granular bodies.

2. In apparatus for sorting granular bodies having smooth surfaces from granular bodies having rugose surfaces, the combination with a support, of a floor carried by the support, comprising a series of axially inclined rollers tangentially arranged as to the adjacent rollers, each of said rollers having a resilient sheath with its periphery grained to correspond with the rugosities of the granular bodies to be separated from the smooth surfaced granular bodies, a hopper for distributing the granular bodies across the upper part of the table, means for rotating the alternate rollers in opposite directions and said means also operating to reverse the direction of rotation so that each pair of adjacent rollers first operate to engage the rugose bodies to pass the latter through the table and then operate to repel the smooth bodies so that the latter are impelled along the declined rollers.

In testimony whereof I have signed my name to this specification.

CLAUDE BUSSARD.